US012762802B2

(12) United States Patent
Izhar et al.

(10) Patent No.: US 12,762,802 B2
(45) Date of Patent: Oct. 13, 2026

(54) VIRTUAL OBJECT INTERACTION IN AUGMENTED REALITY

(71) Applicant: Rockwell Automation Technologies, Inc., Mayfield Heights, OH (US)

(72) Inventors: Rafi Izhar, Kiln Farm (GB); Simon Blackwell, Kiln Farm (GB); Pascal Gilbraith, Kiln Farm (GB); John Howard Pritchard, Great Missenden (GB)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 200 days.

(21) Appl. No.: 18/128,127

(22) Filed: Mar. 29, 2023

(65) Prior Publication Data

US 2024/0161419 A1 May 16, 2024

Related U.S. Application Data

(60) Provisional application No. 63/425,226, filed on Nov. 14, 2022.

(51) Int. Cl.

*G06T 19/00* (2011.01)
*G06F 3/01* (2006.01)
*G06T 15/20* (2011.01)
*G06V 40/20* (2022.01)

(52) U.S. Cl.

CPC ............ *G06T 19/006* (2013.01); *G06F 3/017* (2013.01); *G06T 15/205* (2013.01); *G06V 40/20* (2022.01)

(58) Field of Classification Search

CPC ..... G06T 19/006; G06T 15/205; G06F 3/017; G06F 2203/04801; G06F 3/04812; G06F 3/04815; G06F 3/04842; G06F 3/011; G06V 40/20; G05B 19/418

See application file for complete search history.

(56) References Cited

U.S. PATENT DOCUMENTS 8,854,433 B1 * 10/2014 Rafii ........................ G06F 3/011 348/42
9,383,895 B1 * 7/2016 Vinayak .............. G06F 3/04883
10,140,776 B2 * 11/2018 Schwarz ............. G06F 3/04842
10,234,935 B2 * 3/2019 Schwarz .............. G02B 27/017
10,281,987 B1 * 5/2019 Yang ..................... G06F 3/0426
10,504,285 B2 * 12/2019 Fitzmaurice ............ G06T 15/20
10,802,600 B1 * 10/2020 Ravasz .................... G06F 3/013
10,890,967 B2 * 1/2021 Stellmach ............... G06F 3/013

(Continued)

OTHER PUBLICATIONS

EP Extended Search Report for EP Application No. 23208754.4, Mailed Mar. 5, 2024, 11 pages.

*Primary Examiner* — Motilewa Good-Johnson
(74) *Attorney, Agent, or Firm* — Fletcher Yoder, P.C.

(57) ABSTRACT

A method includes using at least one processor to receive image data including one or more virtual objects and determining a distance between a user extremity and the one or more virtual objects based on the image data. Further, the method includes detecting a first gesture of the user extremity based on the image data and generating a virtual sphere within a virtual object of the one or more virtual objects. The method also includes determining that the distance is less than a threshold, detecting movement of the user extremity based on the image data, and adjusting a position of the virtual object based on the movement of the user extremity.

20 Claims, 8 Drawing Sheets

(56) References Cited

U.S. PATENT DOCUMENTS

| | | | | |
|---|---|---|---|---|
| 10,901,531 | B2 * | 1/2021 | Lee | G06F 3/04842 |
| 10,942,577 | B2 | 3/2021 | Nguyen et al. | |
| 10,991,163 | B2 * | 4/2021 | Ravasz | G06F 3/04845 |
| 11,107,265 | B2 * | 8/2021 | Tang | G06T 19/003 |
| 11,189,099 | B2 * | 11/2021 | Ravasz | G06F 3/013 |
| 11,257,280 | B1 * | 2/2022 | Pedrotti | G06F 3/04812 |
| 11,294,475 | B1 * | 4/2022 | Pinchon | G06F 3/0338 |
| 11,475,642 | B2 * | 10/2022 | Fan | G06F 17/16 |
| 11,983,326 | B2 * | 5/2024 | Lacey | G06V 40/28 |
| 12,236,680 | B2 * | 2/2025 | Yang | H04R 25/70 |
| 12,287,921 | B2 * | 4/2025 | Lindmeier | G06F 3/04815 |
| 2003/0025725 | A1 * | 2/2003 | Nie | G06T 9/004 715/719 |
| 2012/0113223 | A1 * | 5/2012 | Hilliges | G06F 3/00 348/46 |
| 2015/0169076 | A1 * | 6/2015 | Cohen | G06F 3/0304 345/156 |
| 2015/0169176 | A1 * | 6/2015 | Cohen | G06F 3/017 715/852 |
| 2016/0078679 | A1 * | 3/2016 | Maximo | G06F 3/017 345/633 |
| 2016/0196692 | A1 * | 7/2016 | Kjallstrom | G06T 19/006 345/633 |
| 2019/0042957 | A1 * | 2/2019 | Holz | G06F 3/017 |
| 2019/0258320 | A1 * | 8/2019 | Yang | G06F 3/04815 |
| 2020/0097077 | A1 | 3/2020 | Nguyen et al. | |
| 2020/0225736 | A1 * | 7/2020 | Schwarz | G06T 19/006 |
| 2020/0225830 | A1 * | 7/2020 | Tang | G06F 3/011 |
| 2020/0226814 | A1 | 7/2020 | Tang et al. | |
| 2020/0301563 | A1 | 9/2020 | Gelman et al. | |
| 2021/0081054 | A1 * | 3/2021 | Yang | G06F 3/0486 |
| 2021/0090331 | A1 * | 3/2021 | Ravasz | G06T 19/20 |
| 2021/0263593 | A1 * | 8/2021 | Lacey | G02B 27/017 |
| 2022/0084279 | A1 * | 3/2022 | Lindmeier | G06F 3/012 |
| 2023/0195236 | A1 * | 6/2023 | Sun | G06F 3/017 345/157 |
| 2024/0103636 | A1 * | 3/2024 | Lindmeier | G06F 3/0346 |
| 2025/0103195 | A1 * | 3/2025 | Santosa | G06F 3/017 |

* cited by examiner

VIRTUAL OBJECT INTERACTION IN AUGMENTED REALITY

CROSS-REFERENCE TO RELATED APPLICATION

This application claims priority to and the benefit of U.S. Patent Application No. 63/425,226, entitled "VIRTUAL OBJECT INTERACTION IN AUGMENTED REALITY", filed Nov. 14, 2022, which is herein incorporated by reference in its entirety for all purposes.

BACKGROUND

This disclosure relates generally to augmented reality systems. More particularly, embodiments of the present disclosure are related to systems and methods for interacting with visualizations associated with an industrial automation device or an industrial system.

Augmented reality (AR) or virtual reality (VR) devices provide layers of computer-generated content superimposed (e.g., overlaid) on a visualization of a real-world environment to a user via a display. That is, an AR environment may provide a user with a combination of real-world content and computer-generated content via the display. Augmented reality devices may include, for example, a head mounted device, smart glasses, a virtual retinal display, a contact lens, a computer, or a hand-held device, such as a mobile phone or a tablet. As AR devices become more widely available, these devices may be used to assist users in industrial automation environments to perform certain tasks and/or to remotely visualize components or tasks associated with the industrial automation environment. With this in mind, it may be desired for AR devices to improved methods of interacting with the computer-generated content. For example, it may be desired that a user both interact with the real-world content and the computer-generated content at least partially at a same time.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

BRIEF DESCRIPTION

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In one embodiment, a method includes receiving, via at least one processor, image data including one or more virtual object and determining, via the at least one processor, a distance between a user extremity and the one or more virtual objects based on image data. The method also includes detecting, via the at least one processor, a first gesture of the user extremity based on the image data and generating, via the at least one processor, a virtual sphere within a virtual object of the one or more objects. Further, the method includes determining, via the at least one processor, that the distance is less than a threshold and detecting movement of the user extremity based on the image data. Even further, the method includes adjusting, via the at least one processor, a position of the virtual object based on the movement of the user extremity.

In another embodiment, a tangible, non-transitory, computer-readable medium configured to store instructions executable by at least one processor in a computing device, where in the instructions are configured to cause the at least one processor to receive image data including a virtual object, determine a distance between a user extremity and the virtual object based on the image data, and detect a first gesture of the user extremity based on the image data. The operations also include generate a virtual sphere within the virtual object and determine that the distance is less than a threshold. Further, the operations include detect movement of the user extremity based on the image data and adjust a position of the virtual object based on the movement of the user extremity.

In yet another embodiment, a system includes an image sensor configured to capture image data and a processor configured to perform operations including receiving image data from the image sensor, generating a virtual object and superimposing the virtual object on the image data, and determining a distance between a user extremity and the virtual object based on the image data. Further, the processor may be configured to perform operations including detecting a first gesture of the user extremity based on the image data, generating a virtual sphere within the virtual object, determining the distance is less than a threshold, detecting movement of the user extremity based on the image data, and adjusting a position of the virtual object based on the movement of the user extremity.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter

BRIEF DESCRIPTION OF THE DRAWINGS

These and other features, aspects, and advantages of the present embodiments will become better understood when the following detailed description is read with reference to the accompanying drawings in which like characters represent like parts throughout the drawings, wherein.

DETAILED DESCRIPTION

Figure 1:
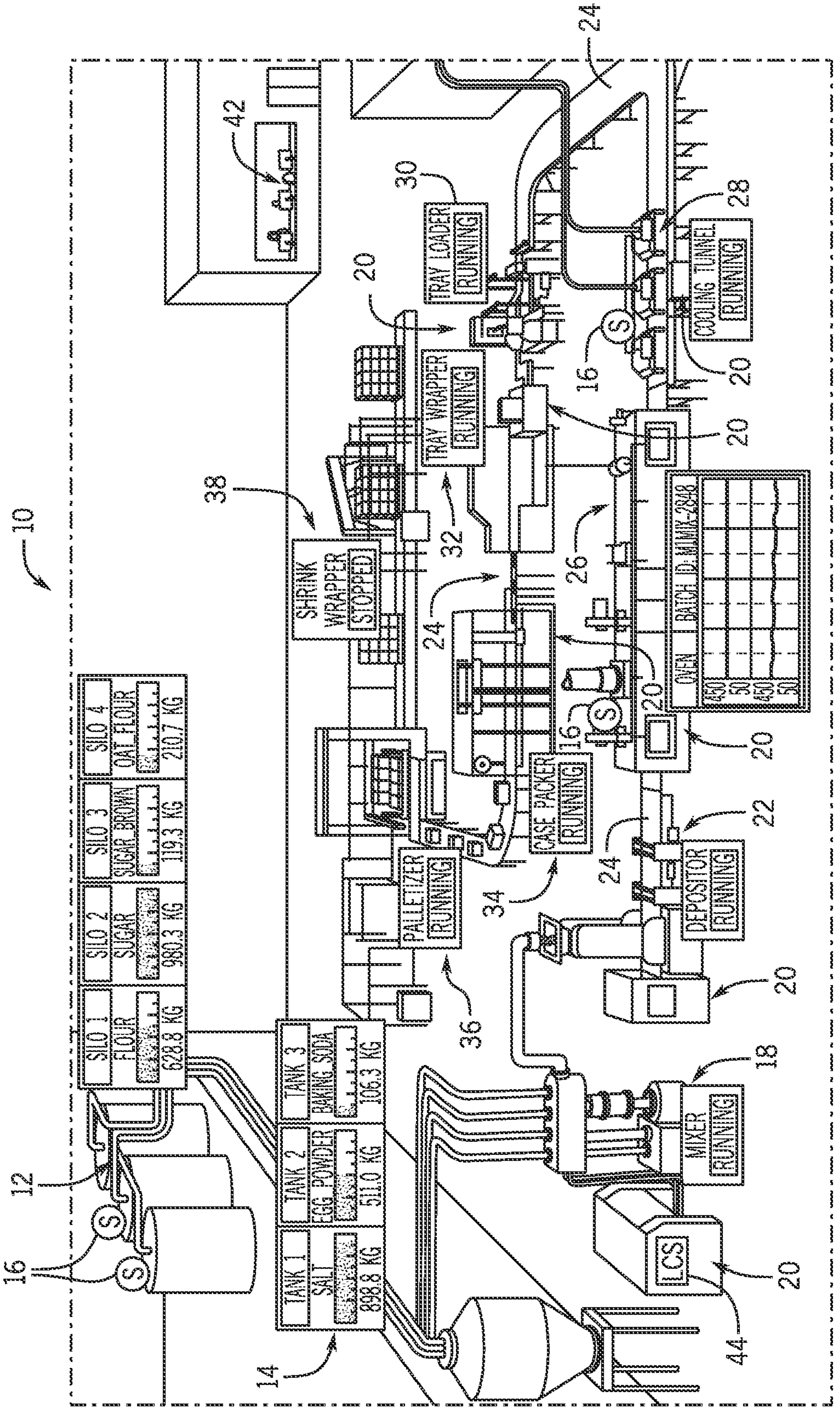
FIG. 1 illustrates an example virtual industrial automation system employed by a food manufacturer, in accordance with an embodiment as described in the present disclosure.

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements.

As described above, it may be desired that augmented reality (AR) devices have improved methods of interacting with computer-generated content. Unfortunately, in an AR environment having a number of virtual objects, it may be difficult to enable a user to select and interact with any particular one of the available virtual objects. Additionally, even after a virtual object is selected or identified, there may be added difficulty in the re-positioning and rotating the virtual object in the AR environment. Therefore, it may be desirable to provide improved systems for interacting with virtual objects in the AR or VR environments, while allowing for the re-positioning and rotating of the virtual objects.

With the foregoing in mind, the present disclosure is generally directed towards an object interaction system that may display one or more visualizations of a combination of real-world and computer-generated content, like virtual objects, in an AR or VR environment to a user. Systems and methods described herein may include detecting a first gesture made in the real-world environment to associate a virtual sphere with a virtual object. The virtual sphere may be generated by the object interaction system to track the location of the first gesture input. For example, the location of pinched fingers of a user may be tracked by the object interaction system. The object interaction system may lock a pointer cursor or user extremity to the virtual object at the virtual sphere in response to detecting the first gesture input. The object interaction system may then detect movement of the user extremity or pointer cursor. Further, the positioning of the virtual object may be adjusted based on the on the detected movement. The virtual object may also be adjusted based on rotational movement with respect to the virtual sphere and the detected motion or may be adjusted with respect to a three-dimensional coordinate system and the detected motion. By associating the movement of the virtual object to the movement of the virtual sphere, the ability for a user to interact with virtual objects may become more efficient and intuitive.

By way of introduction, FIG. 1 illustrates an example of a virtual industrial automation system 10 employed by a food manufacturer. The virtual industrial automation system 10 may be representative of a real-life industrial automation system and may include various virtual devices representative of various devices in the real-life factory, as illustrated. The present embodiments described herein may be implemented using the various virtual devices illustrated in the virtual industrial automation system 10 described below. However, it should be noted that although the example virtual industrial automation system 10 of FIG. 1 is directed at a food manufacturer, the present embodiments described herein may be employed within any suitable industry, such as automotive, mining, hydrocarbon production, manufacturing, and the like. The following brief description of the example virtual industrial automation system 10 employed by the food manufacturer is provided herein to help facilitate a more comprehensive understanding of how the embodiments described herein may be applied to industrial devices to significantly improve the operations of the respective industrial automation system. As such, the embodiments described herein should not be limited to be applied to the example depicted in FIG. 1.

Referring now to FIG. 1, the example virtual industrial automation system 10 for a food manufacturer may include silos 12 and tanks 14. The silos 12 and the tanks 14 may store different types of raw material, such as grains, salt, yeast, sweeteners, flavoring agents, coloring agents, vitamins, minerals, and preservatives. In some embodiments, sensors 16 may be positioned within or around the silos 12, the tanks 14, or other suitable locations within the virtual industrial automation system 10 to measure certain properties, such as temperature, mass, volume, pressure, humidity, and the like.

The raw materials may be provided to a mixer 18, which may mix the raw materials together according to a specified ratio. The mixer 18 and other machines in the virtual industrial automation system 10 may include certain industrial automation devices 20 (e.g., virtual industrial automation devices or virtual objects) that may control the operations of the mixer 18 and other machines. The virtual industrial automation devices 20 may include controllers, input/output (I/O) modules, motor control centers, motors, human machine interfaces (HMIs), operator interfaces, contactors, starters, sensors 16, actuators, conveyors, drives, relays, protection devices, switchgear, compressors, sensor, actuator, firewall, network switches (e.g., Ethernet switches, modular-managed, fixed-managed, service-router, industrial, unmanaged, etc.) and the like.

The mixer 18 may provide a mixed compound to a depositor 22, which may deposit a certain amount of the mixed compound onto conveyor 24. The depositor 22 may deposit the mixed compound on the conveyor 24 according to a shape and amount that may be specified to a control system for the depositor 22. The conveyor 24 may be any suitable conveyor system that transports items to various types of machinery across the virtual industrial automation system 10. For example, the conveyor 24 may transport deposited material from the depositor 22 to an oven 26, which may bake the deposited material. The baked material may be transported to a cooling tunnel 28 to cool the baked material, such that the cooled material may be transported to a tray loader 30 via the conveyor 24. The tray loader 30 may include machinery that receives a certain amount of the cooled material for packaging. By way of example, the tray loader 30 may receive 25 ounces of the cooled material, which may correspond to an amount of cereal provided in a cereal box.

A tray wrapper 32 may receive a collected amount of cooled material from the tray loader 30 into a bag, which may be sealed. The tray wrapper 32 may receive the collected amount of cooled material in a bag and seal the bag using appropriate machinery. The conveyor 24 may transport the bagged material to case packer 34, which may package the bagged material into a box. The boxes may be transported to a palletizer 36, which may stack a certain number of boxes on a pallet that may be lifted using a forklift or the like. The stacked boxes may then be transported to a shrink wrapper 38, which may wrap the stacked boxes with shrink-wrap to keep the stacked boxes together while on the pallet. The shrink-wrapped boxes may then be transported to storage or the like via a forklift or other suitable transport vehicle.

In some embodiments, the virtual industrial automation devices 20 may provide power to the machinery used to perform certain tasks, provide protection to the machinery from electrical surges, prevent injuries from occurring with human operators in the virtual industrial automation system 10, monitor the operations of the respective device, communicate data regarding the respective device to a supervisory control system 40, and the like. In some embodiments, each real industrial automation device 20 or a group of real industrial automation devices 20 may be controlled using a local control system 42. The local control system 42 may include receive data regarding the operation of the respective industrial automation device 20, other industrial automation devices 20, user inputs, and other suitable inputs to control the operations of the respective industrial automation device(s) 20.

In addition, the virtual industrial automation devices 20, the supervisory control system 40, the local control system 42, and other network-capable devices within the virtual industrial automation system 10 may be represented as virtual objects to an object interaction system 50. The object interaction system 50 may be embodied by a computing device, a cloud computing device, and the like. The object interaction system 50 may include an infrastructure of server devices, databases, storage components, and the like to facilitate the flow of data between the virtual objects (e.g., virtual industrial automation devices 20) and other network-capable devices within the virtual industrial automation system 10. By way of operation, the object interaction system 50 may access and execute software that enables the object interaction system 50 to coordinate with other third-party devices (e.g., servers), establish secure communication channels with connected devices, perform various services on connected devices, and the like.

Figure 2:
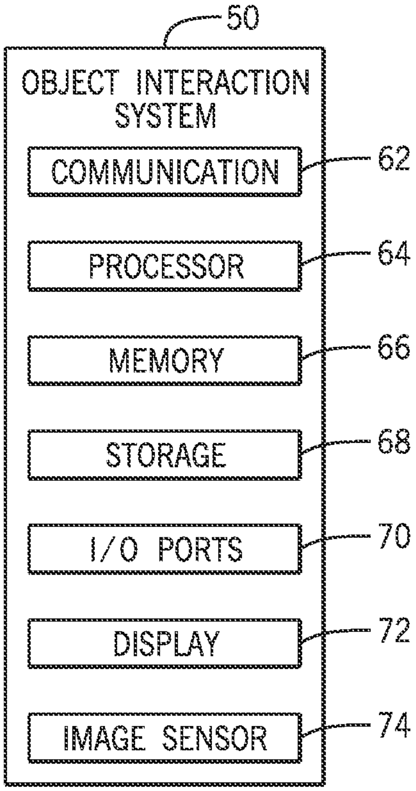
FIG. 2 is a block diagram of example components that may be a part of an object interaction system that may be implemented in the industrial automation system of FIG. 1, in accordance with an embodiment.

By way of example, FIG. 2 illustrates a diagrammatical representation of an exemplary object interaction system 50 that may be employed for use in any suitable virtual industrial automation system 10, in accordance with embodiments presented herein. As shown in FIG. 2, the object interaction system 50 may include a communication component 62 (e.g., communication circuitry), a processor 64, a memory 66, a storage 68, input/output (110) ports 70, a display 72, an image sensor 74, and the like. The communication component 62 may be a wireless or wired communication component that may facilitate communication between the industrial automation devices 20, the local control system 42, and other communication capable devices.

The processor 64 may be any type of computer processor or microprocessor capable of executing computer-executable code. The processor 64 may also include multiple processors that may perform the operations described below. The memory 66 and the storage 68 may be any suitable articles of manufacture that can serve as media to store processor-executable code, data, or the like. These articles of manufacture may represent computer-readable media (e.g., any suitable form of memory or storage) that may store the processor-executable code used by the processor 64 to perform the presently disclosed techniques. Generally, the processor 64 may execute software applications that include presenting and interacting with virtual objects detected by the object interaction system 50.

The memory 66 and the storage 68 may also be used to store the data, analysis of the data, the software applications, and the like. For example, the memory 66 and the storage 68 may store instructions associated with coordinating operations with other service devices, databases, and the like to perform the techniques described herein. The memory 66 and the storage 68 may represent non-transitory computer-readable media (e.g., any suitable form of memory or storage) that may store the processor-executable code used by the processor 64 to perform various techniques described herein. It should be noted that non-transitory merely indicates that the media is tangible and not a signal.

The I/O ports 70 may be interfaces that may couple to other peripheral components such as input devices (e.g., keyboard, mouse), sensors, input/output (I/O) modules, and the like. The I/O modules may enable the industrial automation devices 20 to communicate with the object interaction system 50 or other devices in the virtual industrial automation system 10 via the I/O modules. As such, the I/O modules may include power modules, power monitors, network communication modules, and the like manufactured by the various manufacturers.

The display 72 may depict visualizations associated with software or executable code being processed by the processor 64. In one embodiment, the display 72 may be a touch display capable of receiving inputs (e.g., parameter data for operating the industrial automation equipment) from a user of the industrial automation device 20. As such, the display 72 may serve as a user interface to communicate with control/monitoring device 48. The display 72 may display a graphical user interface (GUI) for operating the respective devices and the like. The display 72 may be any suitable type of display, such as a liquid crystal display (LCD), plasma display, or an organic light emitting diode (OLED) display, for example. Additionally, in one embodiment, the display 72 may be provided in conjunction with a touch-sensitive mechanism (e.g., a touch screen) that may function as part of a control interface for the connected devices. The image sensor 74 may include any image acquisition circuitry such as a digital camera capable of acquiring digital images, digital videos, or the like. The display 72 may also include headsets or electronic glasses that allow users to view virtual objects in a VR or AR environment.

Although the components described above have been discussed with regard to the object interaction system 50, it should be noted that similar components may make up other computing devices (e.g., local control system 42) described herein. Further, it should be noted that the listed components are provided as example components and the embodiments described herein are not to be limited to the components described with reference to FIG. 2.

Keeping the foregoing in mind, in some embodiments, the memory 66 and/or storage 68 of the object interaction system 50 may include one or more software applications that may be executed by the processor 64 and may be used to access, update, monitor, and interact with the virtual objects represented by the industrial automation devices 20 and the like. That is, the software applications may perform some of the embodiments described below including detecting gestures and updating positions and orientations of virtual objects as described herein.

In some embodiments, each virtual object may be associated with a menu or a web user interface that may be presented next to each virtual object. Indeed, each virtual object may be associated with its own respective user interface to allow a user to move the virtual object or rotate the virtual object. However, the display and interaction by the user with each user interface of each virtual object may use more computing resources to function, resulting in higher amounts of power being consumed and slower computational speeds. Additionally, interaction with each virtual object may become more complex and may deflect from the user's ability to interact with each virtual object. As such, the present embodiments include using a virtual sphere and a detected movement or the user or pointer cursor to adjust a position of the virtual object. In this manner, user interaction with virtual objects may become more user friendly and efficient.

Figure 3:
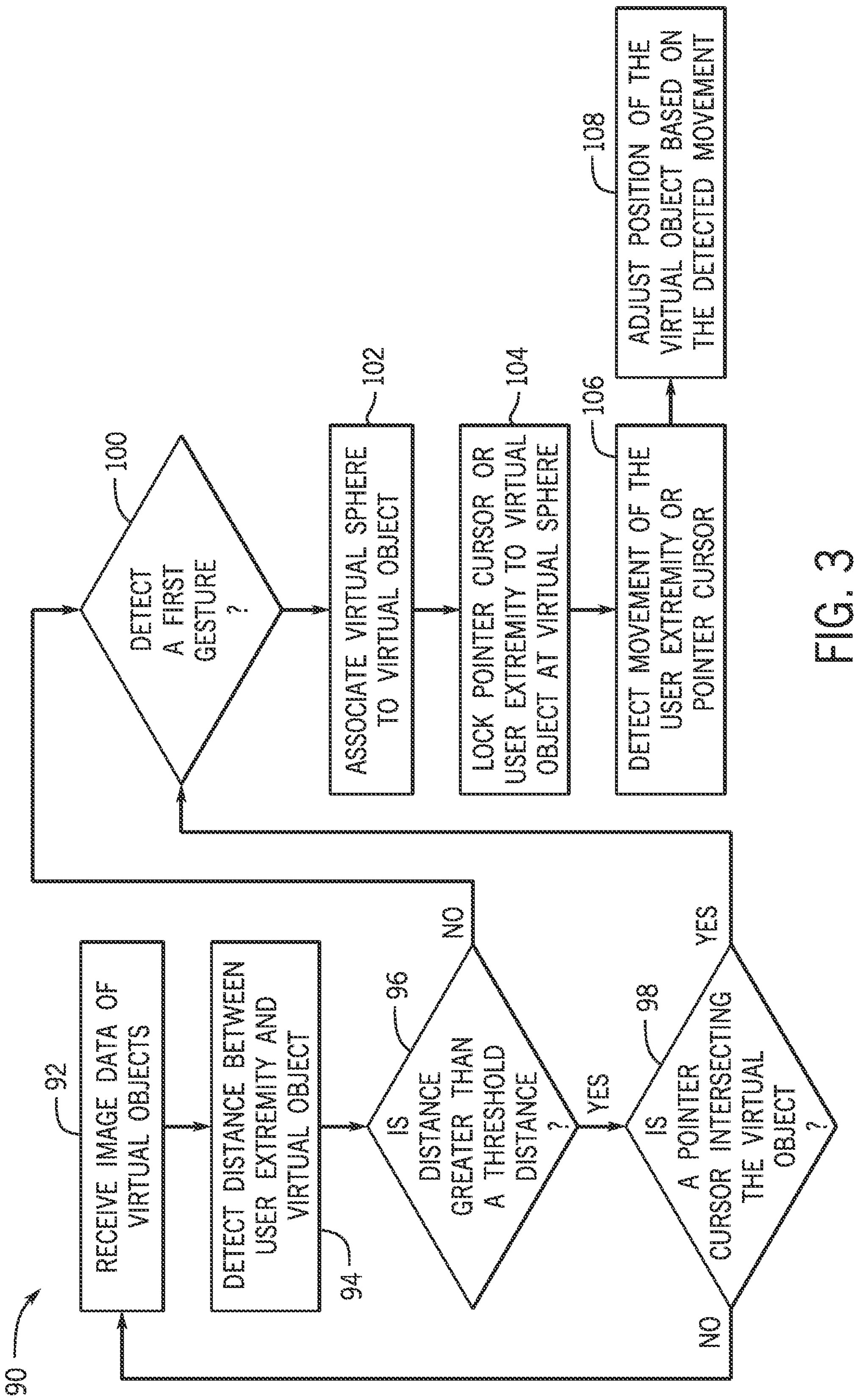
FIG. 3 illustrates a flow chart of a method in which the object interaction system interacts with virtual objects using a virtual sphere, in accordance with an embodiment.

FIG. 3 illustrates a flow chart of a method 90 in which the object interaction system 50 interacts with virtual objects using a virtual sphere, in accordance with aspects of the present disclosure. Although the following description of FIG. 3 is discussed as being performed by the object interaction system 50, it should be understood that any suitable computing device may perform method 90 in any suitable order.

Referring now to FIG. 3, the object interaction system 50 may receive an instruction to start an interactive visualization of an AR environment. At process block 92, the object interaction system 50 may receive image data of the virtual objects in the AR environment. The image data may include data acquired by the image sensor 74, such that the data provides information related to the virtual objects, the AR environment, and the user. Further, the image data may be related to the user's directional view, user extremity movement, and the user's surroundings. Therefore, the image data received may be altered by the movement of the user or the users' extremities through the environment.

Figure 4:
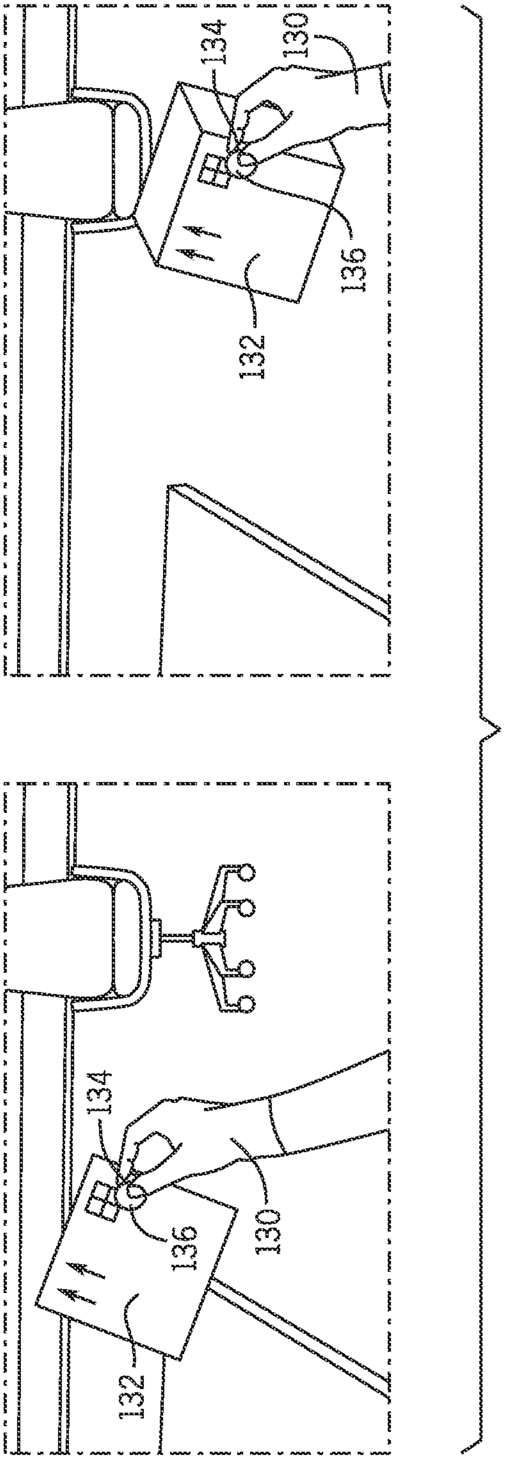
FIG. 4 illustrates an example augmented reality (AR) environment with two example virtual objects associated with a lock pointer cursor and a detected first gesture, in accordance with an embodiment.

At process block 94, the object interaction system 50 may detect a distance between a user extremity 130 and a virtual object 132. In some embodiments, the distance may be detected by applying a distance algorithm that approximates a distance value based on a position of the virtual object 132 relative to the user extremity 130, as depicted in image data acquired by the object interaction system 50. However, it should be understood that the distance may be determined in any suitable manner. As illustrated in FIG. 4, the object interaction system 50 may receive the image data, and by analyzing the image data and performing a distance analysis, may detect the distance (e.g., 6 inches, 12 inches, 18 inches, and so on) between the user extremity 130 within the image data and the virtual object 132 the user may wish to interact with.

After the distance between the user extremity 130 and the virtual object 132 has been detected, at process block 96, the object interaction system 50 may determine whether the distance is greater than a threshold distance. The threshold distance may be, for example, any distance that is greater than the user extremity 130 intersecting with the virtual object 132. In another example, the predetermined threshold may be set to any suitable distance (e.g., 12 inches), such that the object interaction system 50 may perform the operation at process block 96 to determine whether the detected distance is greater than the threshold distance. If the distance is not greater than the threshold distance, the object interaction system 50 may proceed to process block 100.

At process block 100, the object interaction system 50 may detect a first gesture (e.g., movement), which may correspond to a particular command. For example, FIG. 4 illustrates a first gesture 134 being detected by the object interaction system 50. In some embodiments, the object interaction system 50 may employ gesture detection software (e.g., vision analysis) to interpret a command being conveyed by the user and that may be used to manipulate both the movement and rotation of the virtual object 132 within the AR environment. The gesture detection software may detect gestures that include, but are not limited to, grabbing, latching, pinching, pulling, pushing, releasing, twisting, and the like. Additionally, the detected gestures may include those that may be performed by more than one user extremity 130, such as by the user's left hand and/or the user's right hand. As such, different gestures can be assigned and reassigned to perform various functions for the virtual object while operating within the AR environment. As illustrated in FIG. 4, the object interaction system 50 may detect the first gesture 134 of the user's extremity 130, which intersects a space that the virtual object 132 encompasses. In particular, the first gesture 134 may depict a user pinching motion (e.g., thumb and index finger pushed together) as if to attempt to grab the virtual object 132.

After the object interaction system 50 detects the first gesture 134, the object interaction system 50 may proceed to process block 102 and associate a virtual sphere 136 to the user extremity 130. That is, the object interaction system 50 may generate the virtual sphere 136, as shown in FIG. 4, and associate (e.g., bind) the virtual sphere 136 to the virtual object 132. Therefore, as can be seen in FIG. 4, the virtual sphere 136 may be displayed on the virtual object 132. In some embodiments, the position of the virtual sphere 136 with respect to the virtual object 132 may be determined based on a direction of the first gesture 134 relative to the center of the virtual object 132. For instance, the pinch gesture depicted in FIG. 4 includes the thumb and index fingers of the user pointing towards the virtual object 132 and the virtual sphere 136 is thus presented within the virtual object 132 in a line of direction that corresponds to the thumb and index fingers of the first gesture 134.

Further, at process block 104, the virtual object 132 may be locked or bound to the position or motion of the user extremity 130 at the virtual sphere 136. The locked virtual object 132 may receive commands related to motions, selections, movements, and/or gestures made in the real-world environment by the user extremity 130 to affect both a pointer cursor and the virtual sphere 136 associated with the virtual object 132 simultaneously.

In some embodiments, the virtual object 132 may be passed from one user extremity 130 to the other. For example, if the virtual object 132 was grabbed by the user using the first gesture 134 on their right hand, then the user may grab, pass, or throw the virtual object to their left hand using a second gesture with the right hand, left hand, or both. The user extremity 130 and the virtual sphere 136 associated with the virtual object 132 will remain associated with each other. Indeed, the object interaction system 50 may continuously associate the virtual sphere 136 with the virtual object 132 until the user performs an additional gesture that corresponds to disassociating the virtual object 132 from the user extremity 130, thereby removing the virtual sphere 136. In another embodiment, when there are multiple virtual objects, the object interaction system 50 may perform a distance analysis to determine which virtual object may be more proximate to a location of the first gesture 134 was performed in the real-world environment relative to the AR environment and may use the more proximate virtual object 132 as the virtual object 132 to associate with the virtual sphere 136.

At process block 106, the object interaction system 50 may detect the movement of the user extremity 130. As such, the virtual object 132 bound or associated with the user extremity 130 at the virtual sphere 136 may be moved (e.g., up, down, to the right, and/or to the left) based on the movement of the user extremity 130. For example, as shown in FIG. 4, the user extremity 130 may move the virtual object to the right. As another example, the user may move their user extremity 130 in (e.g., closer to the user) and to the right, or out (e.g., away from the user) and to the left. It should be noted that the movement of the user extremity 130 may be detected on an XYZ coordinate system. The object interaction system 50 may detect that the movement is occurring, a direction the movement is in, the distance of the movement, and a speed. At process block 108, the object interaction system 50 may adjust the position of the virtual object 132 based on the detected movement. The object interaction system 50 adjusts the position of the virtual object 132 by updating the position of the virtual sphere 136 and the associated virtual object 132. In this manner, the user interaction with virtual objects within a threshold distance may become more intuitive and user-friendly and efficient.

With the foregoing in mind and referring back to the process block 96, if the distance detected between the user extremity 130 and the virtual object 132 is greater than a threshold distance, the object interaction system 50 may proceed to process block 98.

Figure 5:
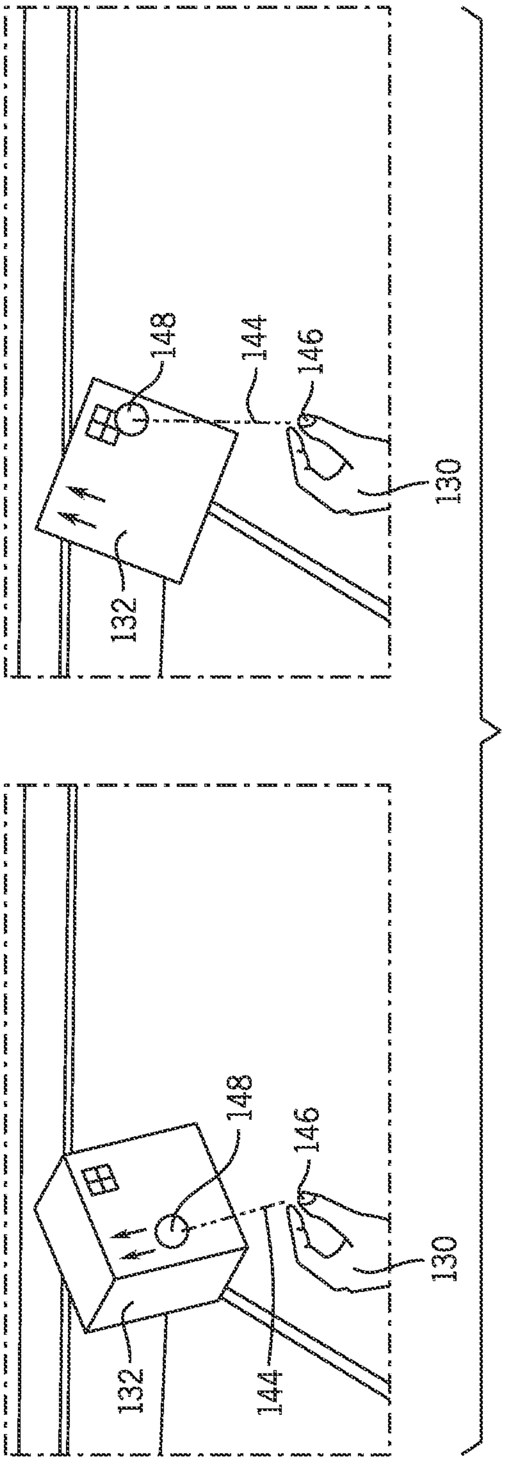
FIG. 5 illustrates an example AR environment with two example virtual objects with a lock pointer cursor touching a surface of a virtual object and visually extending to a location of a detected first gesture, in accordance with an embodiment.

At process block 98, the object interaction system 50 may determine whether a pointer cursor projected in line with the user extremity 130 is intersecting the virtual object. Referring to FIG. 5, the pointer cursor 144 may be presented as a virtual line excreted from the user's extremity 130 and may extend across the AR environment. The object interaction system 50 may detect the pointer cursor 144 intersecting the virtual object 132 by detecting the location of the line in relation to the virtual object 132. If the pointer cursor 144 is not intersecting the virtual object 132, the object interaction system 50 return to process block 92 and perform the method 90 as described herein. That is, in some embodiments, for each user extremity 130, when the pointer cursor 144 is not intersecting the virtual object 132, the objection interaction system 50 may continuously query a range from a location of the user's extremity 130 to check for a potential proximity interaction. If no interactions are found, then the object interaction system 50 may continue to query the range from the location of the user's extremity 130 for the potential proximity interaction, until an interaction (e.g., user extremity within a threshold distance or pointer cursor intersection) occurs.

If the pointer cursor 144 is intersecting the virtual object 132 (e.g., the virtual line of the pointer cursor 144 is at the same coordinates of the virtual object 132), the object interaction system 50 may proceed to process block 100 and detect a first gesture as described above. As shown in FIG. 5, the object interaction system 50 may detect a first gesture 146, which may be used to manipulate both the movement and rotation of the virtual object 132 within the AR environment based on the location of the pointer cursor 144 and the movement of the user extremity 130.

As mentioned above, when the object interaction system 50 determines the grab gesture has been performed, the object interaction system 50 may generate a virtual sphere 148 at a position of the pointer cursor 144 and, at process block 102, associate the virtual sphere 148 with the virtual object 132. In some embodiments, the virtual sphere 148 may be displayed in the center of the virtual object 132 or anywhere the line of the pointer cursor intersects with the virtual object. The position of the virtual sphere 148 may be determined by the object interaction system 50 by determining the direction of the grab gesture performed to the center of the virtual object 132. At process block 104, the virtual object 132 may be locked or bound to the pointer cursor 144 at the virtual sphere 148. The pointer cursor 144 may thus enable motions, selections, movements, and/or gestures made by the user extremity 130 in the real-world environment to affect both the pointer cursor 144 and the virtual sphere 148 associated with the virtual object 132 simultaneously.

At process block 106, the object interaction system 50 may detect the movement of the pointer cursor 144 and may adjust the position of the virtual object 132 based on the detected movement, as described above. The object interaction system 50 may adjust the position of the virtual object 132 by updating the position of the virtual sphere 148 associated with the virtual object 132. As such, the user interaction with virtual objects greater than a threshold distance away may become more user-friendly and efficient.

Figure 6:
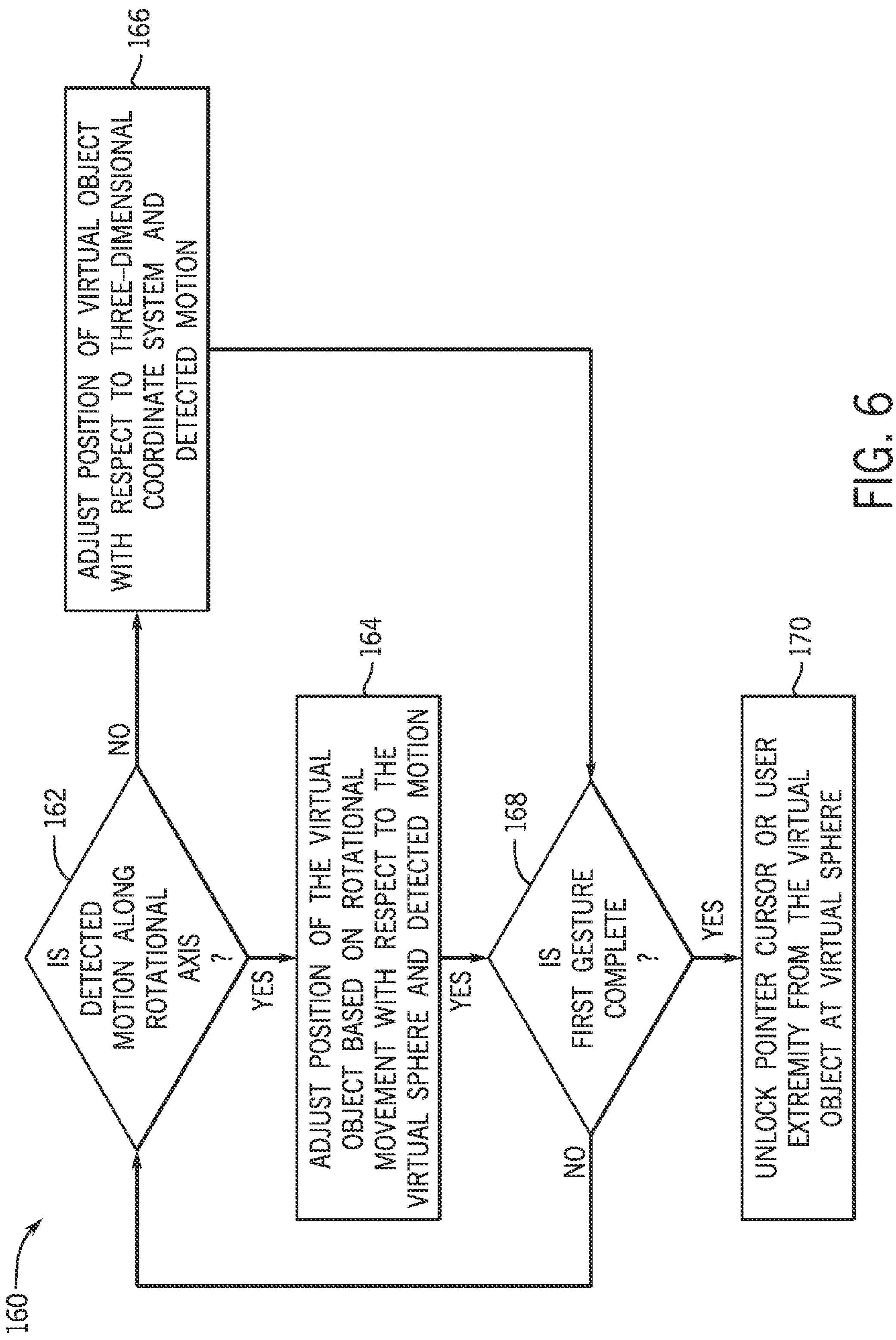
FIG. 6 illustrates a flowchart method in which the object interaction system adjusts a position of a virtual object based on detected motion, in accordance with an embodiment.

As mentioned above, the object interaction system 50 may detect the movement of the user extremity 130. As such, the virtual object 132 bound or associated with the user extremity 130 at the virtual sphere 136 may be adjusted with respect to a three-dimensional coordinate system (e.g., the XYZ coordinate system) or rotationally based on the movement of the user extremity 130. FIG. 6 illustrates a flowchart method in which the object interaction system 50 adjusts a position of a virtual object based on detected motion, in accordance with an embodiment. Although the following description of FIG. 6 is discussed as being performed by the object interaction system 50, it should be understood that any suitable computing device may perform method 160 in any suitable order.

Referring now to FIG. 6, after the movement of the user extremity 130 has been detected, at process block 162, the object interaction system 50 may determine whether the detected motion is along a rotational axis. That, is the object interaction system 50 may determine if the virtual object 132 has been rotated (e.g., spun, revolved) about the rotational axis. The rotational axis may be based on possible rotational directions that may be applied to the virtual object 132 from the motion of the user extremity 130 on the virtual object 132. If the detected motion is along the rotational axis, the object interaction system 50 may proceed to process block 164.

Figure 7:
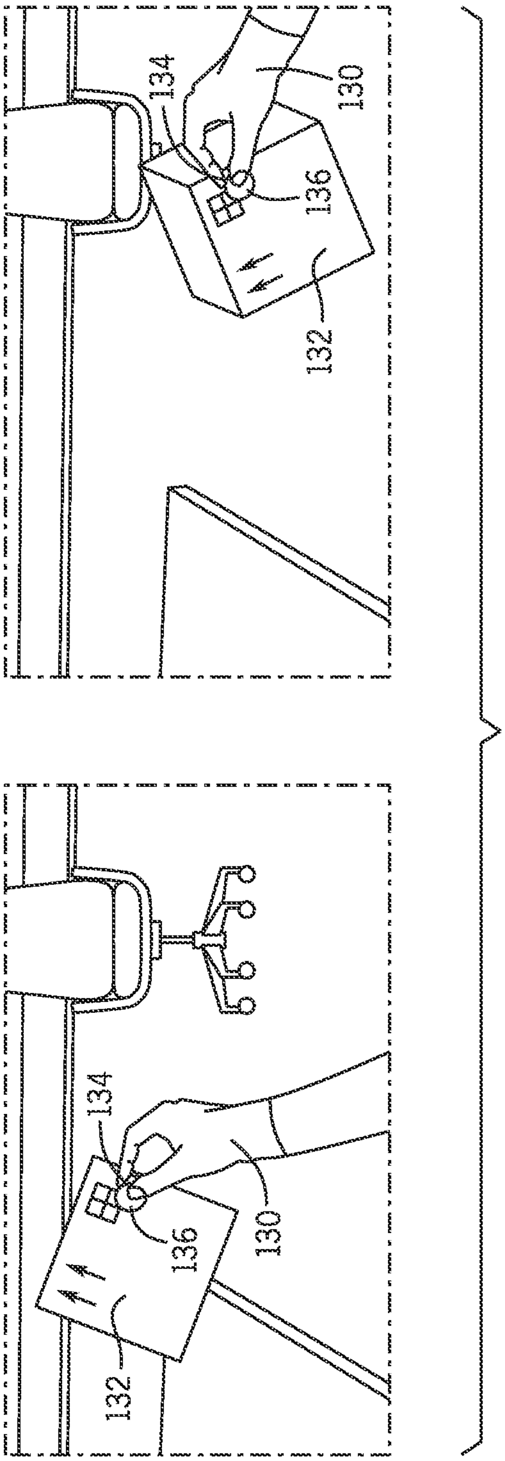
FIG. 7 illustrates an example AR environment with two example virtual objects being adjusted based on rotational movement, in accordance with an embodiment.

At process block 164, the object interaction system 50 adjusts the position of the virtual object 132 based on the rotational movement with respect to the virtual sphere (e.g., 136 or 148) and the detected motion. That is, as shown in FIG. 7, the object interaction system 50 may adjust the position of the virtual object 132 based on the rotational movement by updating the position of the virtual sphere and the associated virtual object 132 in a rotational direction. As illustrated, the position of the virtual object 132 is updated to rotate with the virtual sphere based on a rightward rotational direction.

After the position of the virtual object 132 has been adjusted based on the rotational movement with respect to the virtual sphere and detected motion, at process block 168, the object interaction system 50 may determine whether the first gesture 134 is complete. That is, the object interaction system 50 may employ the gesture detection software (e.g., vision analysis) to interpret the first gesture 134 is no longer being conveyed by the user. Alternatively, the object interaction system 50 may detect an additional gesture at block 168. For instance, the user may release the first gesture 134 (e.g., separate thumb from index finger to create a distance), as if to attempt to release the virtual object. At process block 170, after determining the first gesture 134 is complete, the object interaction system 50 may unlock the pointer cursor 144 or user extremity 130 from the virtual object 132 at the virtual sphere.

With the foregoing in mind, and referring back to process block 162, if the detected motion is not along the rotational axis, and is instead along the three-dimensional coordinate system, the object interaction system 50 may proceed to process block 166.

Figure 8:
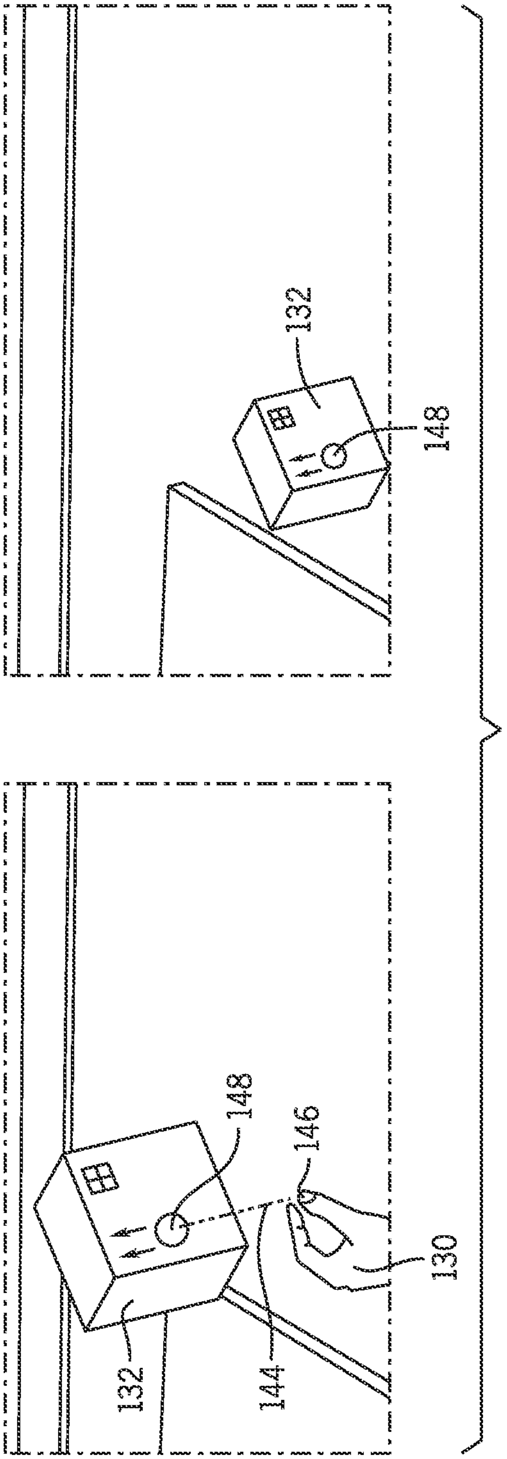
FIG. 8 illustrates another example AR environment with two example virtual objects being adjusted based on rotational movement, in accordance with an embodiment.

At process block 166, the object interaction system 50 adjusts the position of the virtual object 132 with respect to the three-dimensional coordinate system and the detected motion. That is, as disclosed herein, the virtual object 132 associated with the virtual sphere 148 may be moved up, down, to the right, and/or to the left. Additionally, the virtual object 132 may be adjusted to the position closer to the user or away from the user. For instance, as can be seen in FIG. 8, the detected motion of the user extremity 130 is a movement down and out (e.g., away from the user). Therefore, as can be seen in FIG. 8, the virtual object 132 is positioned lower and a greater distance away from the user.

As mentioned above, after the position of the virtual object 132 has been adjusted based on the rotational movement with respect to the three-dimensional coordinate system and detected motion, at process block 168, the object interaction system 50 may determine whether the first gesture 134 is complete (e.g., the user releases the first gesture initially performed). Furthermore, at process block 170, the object interaction system 50 may unlock the pointer cursor 144 or user extremity 130 from the virtual object 132 at the virtual sphere to end the interaction between the user and the virtual object.

It should be noted that although the object interaction system 50 is described above with respect to a singular virtual object, in some embodiments, the object interaction system 50 may allow for interaction with more than one virtual object simultaneously. That is, each user extremity 130 may perform a gesture on each of two virtual objects respectively to allow for the pointer cursor 144 and/or the virtual sphere (e.g., 136 or 148) to individually lock onto each of the two virtual objects. Therefore, two virtual objects may be adjusted based on the detected movement of each user extremity 130 simultaneously. Additionally, each of the virtual objects may collide with each other if the adjusted position results in the virtual objects being within close proximity of each other (e.g., as if virtual objects are colliding).

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A method, comprising:

receiving, via at least one processor, image data comprising two or more virtual objects;

determining, via the at least one processor, a distance between a user extremity and the two or more virtual objects based on the image data;

detecting, via the at least one processor, a first gesture of the user extremity based on the image data, wherein the first gesture comprises a pinch between a thumb of the user extremity and a finger of the user extremity;

generating, via the at least one processor, a virtual sphere to be displayed within or on a virtual object of the two or more virtual objects, wherein the virtual sphere binds to each of the two or more virtual objects while being displayed within or on the virtual object;

determining, via the at least one processor, a position of the virtual sphere to be displayed on or within the virtual object based on a line of direction that corresponds to the thumb of the user extremity and the finger of the user extremity;

determining, via the at least one processor, that the distance is less than a threshold;

locking, via the at least one processor, the position of the virtual sphere individually to each of the two or more virtual objects at a position of the user extremity in response to determining that the distance is less than the threshold;

detecting, via the at least one processor, movement of the position of the user extremity based on the image data; and adjusting, via the at least one processor, two or more positions of the two or more virtual objects based on the movement of the position of the virtual sphere and the position of the user extremity, wherein the adjustment of the two or more positions of the two or more virtual objects comprises a rotational movement relative to the virtual sphere.

2. The method of claim 1, wherein adjusting the position of the two or more virtual objects comprises moving the virtual sphere associated with the two or more virtual objects in a three-dimensional coordinate plane with respect to the movement of the position of the user extremity.

3. The method of claim 1, comprising:

generating, via the at least one processor, a pointer cursor visualization in the image data based on the user extremity in response to the distance being above the threshold; and adjusting, via the at least one processor, the position of the two or more virtual objects based on an additional movement of the pointer cursor visualization.

4. The method of claim 1, wherein the first gesture corresponds to a command for adjusting the position of the two or more virtual objects.

5. The method of claim 1, comprising detecting a second gesture associated with the user extremity based on the image data.

6. The method of claim 5, comprising disassociating the virtual sphere from the two or more virtual objects in response to detecting the second gesture.

7. The method of claim 6, wherein the second gesture corresponds to the user extremity releasing the two or more virtual objects.

8. The method of claim 1, comprising:

generating, via the at least one processor, a pointer cursor visualization based on the user extremity in response to the distance being above an additional threshold.

9. The method of claim 8, comprising:

determining, via the at least one processor, that the pointer cursor visualization is not intersecting the virtual object; and querying, via the at least one processor, a range from the position of the user extremity for an interaction, wherein the interaction comprises the range being within the threshold and an intersection of the pointer cursor visualization with the virtual object.

10. The method of claim 1, comprising:

detecting, via the at least one processor, a second gesture of the user extremity or an additional user extremity; and adjusting, via the at least one processor, the position of the two or more virtual objects to a position of the additional user extremity in response to detecting the second gesture.

11. The method of claim 1, comprising determining, via the at least one processor, that a first adjusted position of a first virtual object of the two or more virtual objects is colliding with a second adjusted position of a second virtual object of the two or more virtual objects based on a proximity of the first virtual object to the second virtual object.

12. A tangible, non-transitory, computer-readable medium configured to store instructions executable by at least one processor in a computing device, wherein the instructions are configured to cause the at least one processor to:

receive image data comprising two or more virtual objects;

determine a distance between a user extremity and the two or more virtual objects based on the image data;

detect a first gesture of the user extremity based on the image data, wherein the first gesture comprises a pinch between a thumb of the user extremity and a finger of the user extremity;

generate a virtual sphere to be displayed within or on a virtual object of the two or more virtual objects, wherein the virtual sphere binds to each of the two or more virtual objects while being displayed within or on the virtual object;

determine a position of the virtual sphere to be displayed on or within the virtual object based on a line of direction that corresponds to the thumb of the user extremity and the finger of the user extremity;

determine that the distance is less than a threshold;

lock the position of the virtual sphere individually to each of the two or more virtual objects at a position of the user extremity in response to determining that the distance is less than the threshold;

detect movement of the position of the user extremity based on the image data; and adjust two or more positions of the two or more virtual objects based on the movement of the position of the virtual sphere and the position of the user extremity, wherein the adjustment of the two or more positions of the two or more virtual objects comprises a rotational movement relative to the virtual sphere.

13. The computer-readable medium of claim 12, wherein the instructions to adjust the position of the two or more virtual objects are configured to cause the at least one processor to move the virtual sphere associated with the two or more virtual objects in a three-dimensional coordinate plane with respect to the movement of the position of the user extremity.

14. The computer-readable medium of claim 12, wherein the instructions to adjust the position of the two or more virtual objects are configured to cause the at least one processor to:

generate a pointer cursor visualization in the image data based on the user extremity in response to the distance being above the threshold; and adjust the position of the two or more virtual objects on an additional movement of the pointer cursor visualization.

15. The computer-readable medium of claim 12, wherein the instructions to adjust the position of the two or more virtual objects are configured to cause the processor to:

detect a second gesture associated with the user extremity based on the image data; and disassociate the virtual sphere from the two or more virtual objects in response to detecting the second gesture.

16. A system, comprising:

an image sensor configured to capture image data; and a processor configured to perform operations comprising:

receiving the image data from the image sensor;

generating two or more virtual objects and superimposing the two or more virtual objects on the image data;

determining a distance between a user extremity and the two or more virtual objects based on the image data;

detecting a first gesture of the user extremity based on the image data, wherein the first gesture comprises a pinch between a thumb of the user extremity and a finger of the user extremity;

generating a virtual sphere to be displayed within or on a virtual object of the two or more virtual objects, wherein the virtual sphere binds to each of the two or more virtual objects while being displayed within or on the virtual object;

determining a position of the virtual sphere to be displayed on or within the virtual object based on a line of direction that corresponds to the thumb of the user extremity and the finger of the user extremity;

determining that the distance is less than a threshold;

locking the position of the virtual sphere individually to each of the two or more virtual objects at a position of the user extremity in response to determining that the distance is less than the threshold;

detecting movement of the position of the user extremity based on the image data; and adjusting two or more positions of the two or more virtual objects based on the movement of the position of the virtual sphere and the position of the user extremity, wherein the adjustment of the two or more positions of the two or more virtual objects comprises a rotational movement relative to the virtual sphere.

17. The system of claim 16, wherein the processor is configured to adjust the position of the two or more virtual objects by moving the virtual sphere associated with the two or more virtual objects in a three-dimensional coordinate plane with respect to the movement of the position of the user extremity.

18. The system of claim 16, wherein the processor is configured to perform the operations comprising:

generating a pointer cursor visualization in the image data based on the user extremity in response to the distance being above the threshold; and adjusting the position of the two or more virtual objects based on an additional movement of the pointer cursor visualization.

19. The system of claim 16, wherein the first gesture corresponds to a command for adjusting the position of the two or more virtual objects.

20. The system of claim 16, wherein the processor is configured to perform the operations comprising:

detecting a second gesture associated with the user extremity based on the image data; and disassociating the virtual sphere from the two or more virtual objects in response to detecting the second gesture.

* * * * *